Patented Feb. 13, 1940

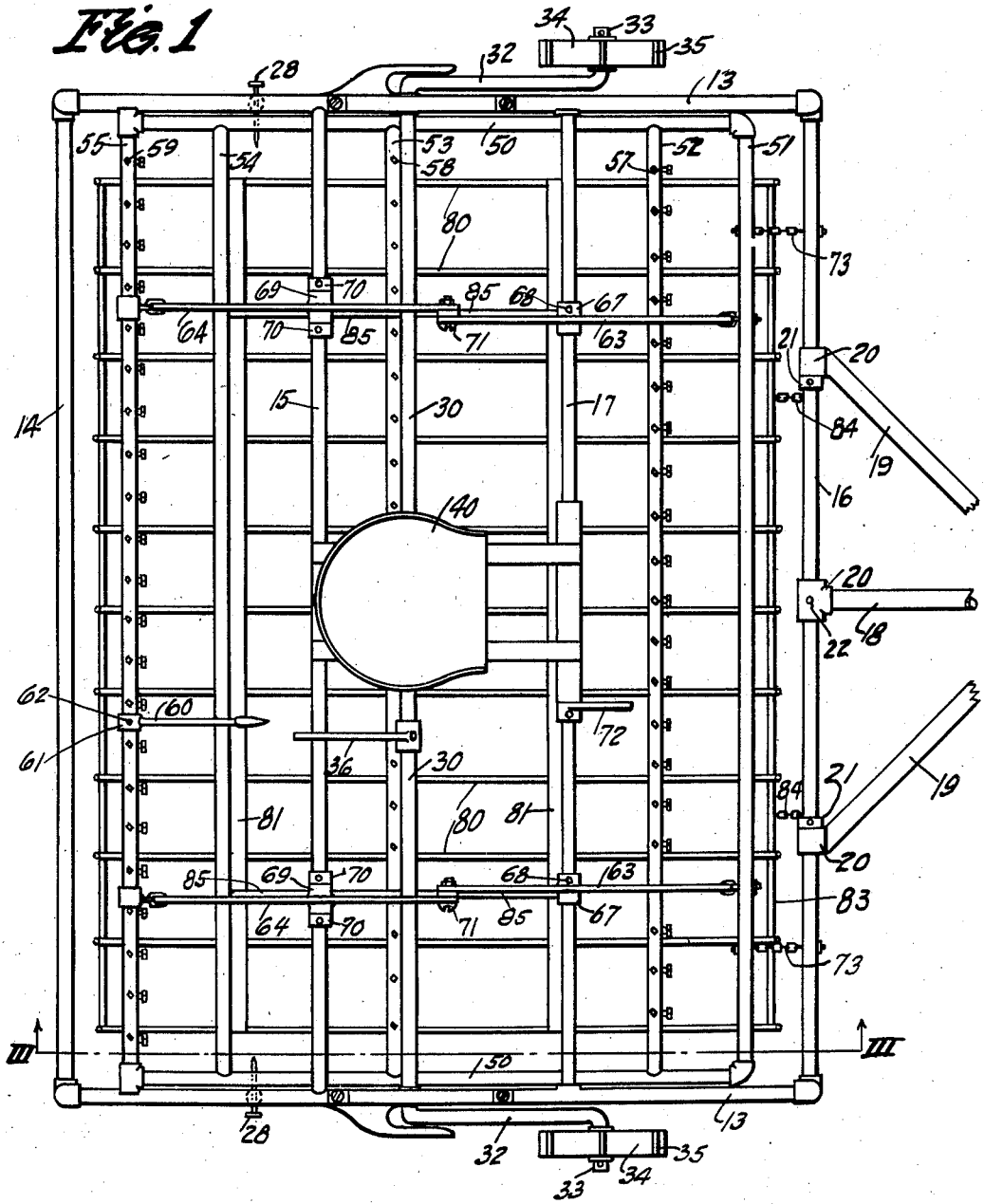

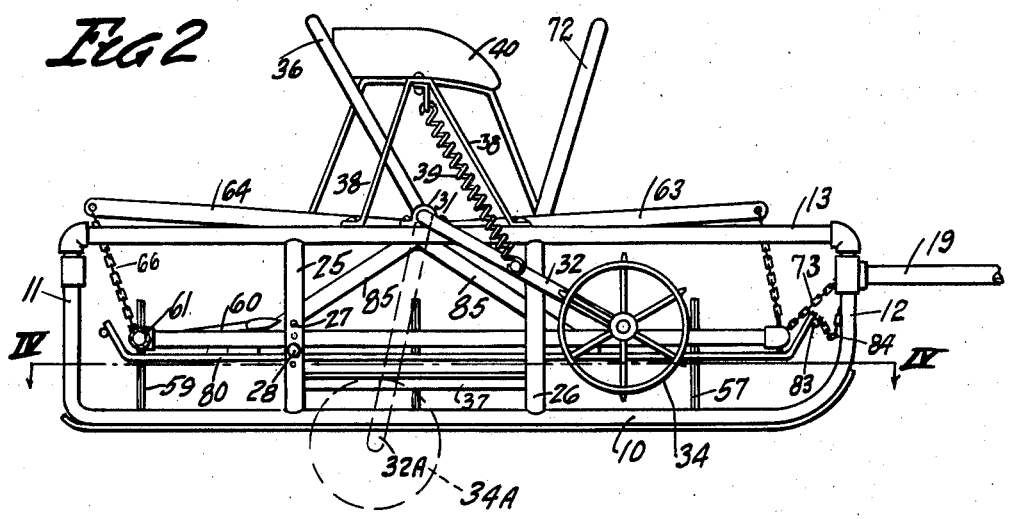
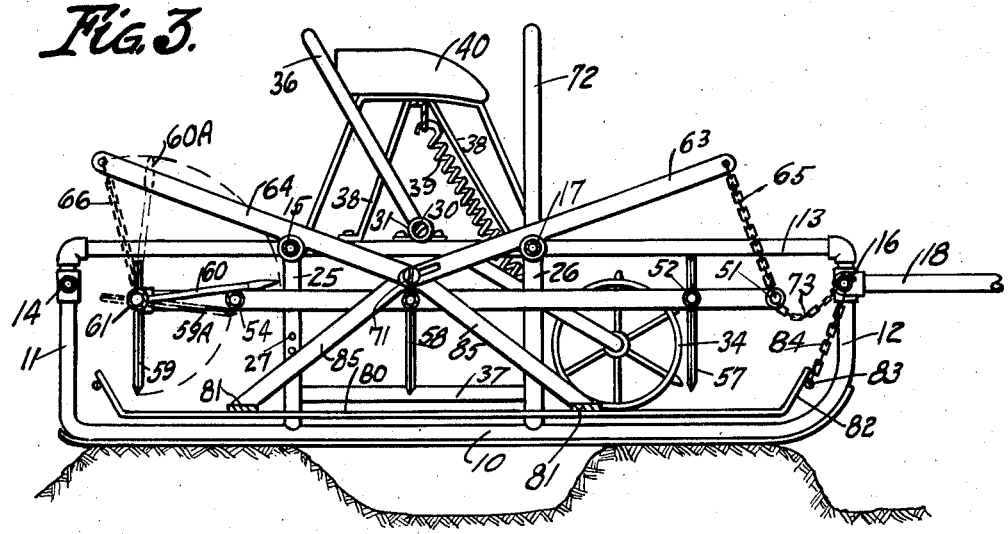
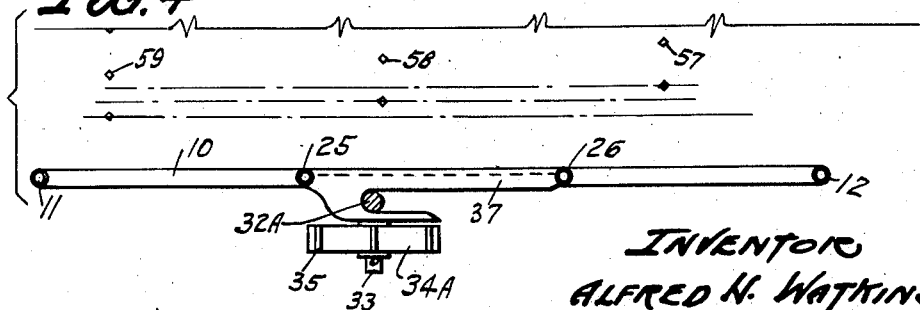

2,190,618

UNITED STATES PATENT OFFICE 2,190,618

CULTIVATING HARROW

Alfred H. Watkins, Crawfordsville, Ark., assignor of one-half to James P. Quinlan, Memphis, Tenn.

Application June 28, 1939, Serial No. 281,502

2 Claims. (Cl. 97—23)

This invention relates to improvements in harrows, and has particular reference to a harrow for cultivating young cotton, corn or the like which are planted in rows, and more especially to a harrow for cultivating cotton which is usually planted in the row in very close or even doubled up conformation so that ordinarily an excessive number of plants come up in the row, a condition which requires that a much larger percentage of plants be removed than are left in the row.

The present harrow is designed for the cultivation of these rows in the early stages of growth of the plants and is predicated on the cultivation of these rows by passing the harrow transversely thereacross.

The objects of the invention are:

The provide in a harrow, a sled-like carrier adapted to support the harrow structure proper.

To provide in a harrow, a sled-like carrier, means for raising and lowering the harrow vertically with respect to such carrier, and means for limiting the extent of the lowering movement.

To provide in connection with a harrow having a sled-like carrier, stripping means and means for concurrently raising the harrow and relatively lowering said stripper means for clearing the teeth of the harrow.

To provide in a harrow a sled having longitudinally positioned runners, a harrow member having transversely disposed groups of harrow teeth, and means for supporting the groups of harrow teeth relatively to the runners.

To provide in a harrow, a carrier having longitudinally disposed runners, a harrow structure having transversely disposed grousp of harrow teeth with the teeth of such groups laterally shifted out of line with the teeth of any other group.

To provide in a harrow, a carrier having longitudinally disposed runners, and a harrow structure supported thereby, said harrow structure having transversely disposed groups of teeth, at least one of said groups being so mounted that it may be shifted into ineffective position.

To provide in a harrow having a carrier with longitudinally disposed runners, and a harrow structure supported by said carrier, a laterally disposed pair of wheels normally supported above the level of the runners, and adapted to be shifted below such level to accomplish a wheel support for turning movement.

The means by which the foregoing and other objects are accomplished and the method of their accomplishment will readily be understood from the following specification on reference to the accompanying drawings, in which:

Fig. 1 is a plan view of the harrow.

Fig. 2 is a side elevation of the harrow with the harrow structure in operative position.

Fig. 3 is a sectional elevation of the harrow taken as on the line III—III of Fig. 1, showing the harrow raised and the stripping mechanism lowered to free the harrow teeth of accumulated trash.

Fig. 4 is a fragmentary sectional plan taken on the line IV—IV of Fig. 2 with the wheel structure shifted to the dotted position shown in that view to show the manner in which the wheel structure is braced and supported when so shifted.

Referring now to the drawings in which the various parts are indicated by numerals:

The carrier comprises a pair of sled sides each having runners 10, from which end members 11 and 12 extend upward and are connected at their upper ends by upper members 13. The two sled sides are connected transversely by cross members 14, 15 and 16 to form a sled-like carrier, and turnably support an additional cross-member 17 for the support of the harrow. 18 is a tongue which preferably has diagonal bracing members 19 and is directly mounted on the cross-member 16. This member may be cylindrical, as a section of pipe, and the connection of the tongue and braces thereto may be effected by sleeves 20 mounted on the member. Collars 21 prevent side displacement of the tongue and brace members. If desired a pin 22 may be passed through the sleeve 20 on the end of the tongue 18 to prevent hinge movement of the tongue around the member 16. The sled sides preferably also are stiffened at intermediate points by vertical posts 25, 26 the posts 25 being provided with rather closely spaced holes 27, into any one of which a supporting pin 28 may be inserted for limiting the downward movement of the harrow.

Mounted transversely across the carrier is a member 30 which is turnably mounted in collars 31 secured to the top of the sled side members 13. The opposite ends of the member 30 are bent downwardly to form legs 32 from which project axles 33 on which wheels 34 are journalled. Preferably the wheels 34 are provided with projecting lugs 35. A lever 36 has one end rigidly secured to the member 30, this lever being manually movable to shift the wheels 34 from the position shown in Figs. 2 and 3 to the position 34A, shown dotted in Fig. 2, and also shown in full lines in Fig. 4. To move the wheels to this dotted position, the legs 32 are moved to the position 32A, shown dotted in Fig. 2, this movement carrying the legs slightly beyond a vertical position and into engagement with forked brackets 37 which arrest their backward movement and at the same time stiffen them against lateral movement. These brackets occur on opposite sides of the frame and are secured to and extend between the vertical posts 25 and 26.

38 are brackets which are likewise mounted on the upper members 13, these brackets serving to support the upper ends of springs 39 which have their lower ends secured to the legs 32 and resiliently support these legs and the wheels carried thereby when these parts are in inactive position. They are moved past dead center and assist in holding the legs seated in the brackets 37 when the wheels are lowered into use position. 40 is a driver's seat.

The harrow comprises a frame having oppositely disposed side members 50 which are transversely connected at their front ends by a transverse member 51, and additionally connected by other transverse members 52, 53 and 54, the frame members extending beyond the rear transverse member 54 and turnably supporting an additional transverse member 55 which is not strictly a frame member. The members 52, 53 and 55 are each provided with a plurality of equally spaced teeth 57, 58 and 59 respectively, these teeth having equal spacing along all three of the members 52, 53 and 55, but the teeth of the member 53 are shifted laterally one-third of the tooth spacing with respect to the teeth of the member 52, and similarly the teeth of the member 55 are shifted an additional one-third tooth spacing with respect to the teeth of the member 53, giving a staggered relation of the three tooth groups. The member 55, as above stated, is rotatably mounted at the rear ends of the side members 50 and may be provided with a handle 60 which is secured thereto as by a sleeve 61 and pin 62. This handle is so disposed that with the teeth 59 in vertical position it rests on the transverse member 54 and effectively holds the teeth against movement under the strain put thereon by forward movement of the harrow. Should at any time it be desired to dispense with one group of harrow teeth the arm 60 may be turned, as to the dotted position 60A, of Fig. 3, and the teeth raised to the dotted position 59A, in which position, being free from strain, they may be held in any suitable or desired manner.

The harrow frame is supported by arms 63, 64 through chains 65, 66 which respectively connect the outer ends of these arms to the transverse members 51 and 55. The arms 63 are provided with hub portions 67 which are keyed to the turnable cross member 17 as by pins 68. The arms 64 are likewise provided with hub members 69, these hub members being turnably mounted on the cross member 15 and being confined against movement along such member as by collars 70. The arms 63 and 64 are respectively extended beyond the collars 67 and 69 and are coupled together in pairs by pins 71, the ends of the arms being slotted to allow such coupling. A lever 72 is suitably secured to the cross member 17 to accomplish turning movement thereof and raising or lowering of the harrow through the intermediary of the arms and chains.

73 are chains coupling the forward harrow frame member 51 with the forward cross member 16 of the carrier.

The harrow teeth are cleaned by a stripper which comprises a number of parallel rods 80 which are secured together by transverse bars 81. The rods 80 have their forward ends 82 upwardly bent and these upwardly bent ends are secured together by an additional transverse bar 83. The rear end of the rods may also be bent upwardly and similarly secured if so desired. The bar 83 is connected for traction by flexible links, as chains 84, with the cross member 16. 85 are A frames which are connected at their lower ends, as by welding, to the transverse bars 81. The pins 71 which couple the levers 63 and 64 together are also used to couple the A frames to these bars, causing the A frames and the stripper rods to be raised as the harrow teeth are lowered and to be lowered, permitting the stripper to lower as the harrow teeth are raised.

In using the device, in the cultivation of plants in rows, the harrow is drawn transversely across the top of the rows, as shown in Fig. 3. The length of the harrow is such that the sled runners 10 will span at least two rows, and ordinarily somewhat more. As the harrow drags across it thoroughly cultivates the top of the row removing a large proportion of the cotton plants as well as the weeds, but ordinarily leaving a full stand. At times however it is found advisable to turn one group of the teeth into inoperative position in order to give slightly greater spacing at intervals and leave a larger proportion of the plants.

It is obvious also that teeth may be removed from any two of the members 52, 53 and 55 in such manner that paths may be left from front to rear at uniform intervals through the harrow and thereby a definite spacing of the plants in the rows be accomplished.

As the harrow is moved forward, trash accumulates on the teeth. To clear the teeth the lever arm 72 is pulled backward raising the outer ends of the arms 63, 64 and through the chains 65, 66 raising the harrow frame and teeth. The inner ends of these arms move the A frames downward causing the stripper rods 80 to push the trash off the end of the teeth. Where the harrow is being drawn transversely across the rows, as shown in Fig. 3, this trash is freed to drop into the furrows between the rows. After such freeing the harrow is again lowered and cultivation resumed.

Should it be desired to decrease the depth of cut, the pins 28 are raised, and the rear of the harrow supported at a higher level, this level being substantially established throughout by the forward pull of the chains 73. Oppositely, the depth of cut may be increased by lowering the pins 28. When the harrow has been moved, as under use, as far in one direction as is desired, as across the field, the lever 36 is shifted to throw the wheels into the dotted position 30A (Fig. 2) and the entire structure relatively raised to permit the device to be easily turned to start the return trip. As the wheels 34 are lowered into contact with the ground the lugs 35 bite in and permit the further forward tractive pull on the device to accomplish the raising of the device for such turning. After turning the wheels are raised and the carrier runners resume their function.

I claim:

1. In a cultivating device, a sled-like carrier, a harrow structure having depending teeth, a stripper adapted to cooperate therewith, and means jointly coupling said harrow structure and stripper to said carrier, said means being shiftable to raise and lower said harrow and to concurrently lower and raise said stripper.

2. In a cultivating device, a sled-like carrier, a harrow structure having depending teeth, a stripper adapted to cooperate therewith, means jointly coupling said harrow structure and stripper to said carrier, said means being shiftable to raise and lower said harrow and to concurrently lower and raise said stripper, and means for limiting lowering movement of said harrow.

ALFRED H. WATKINS.